INVENTOR
ARTHUR D. PLUNKETT
BY
ATTORNEY

Oct. 4, 1960     A. D. PLUNKETT     2,954,757
FLOW CONTROL VALVE

Filed Sept. 16, 1957     3 Sheets-Sheet 3

INVENTOR
ARTHUR D. PLUNKETT
BY

ATTORNEY

United States Patent Office 2,954,757
Patented Oct. 4, 1960

2,954,757

FLOW CONTROL VALVE

Arthur D. Plunkett, 9744 Roma St., Rivera, Calif.

Filed Sept. 16, 1957, Ser. No. 684,119

1 Claim. (Cl. 121—150)

This invention relates to a flow control valve and has for one of its principal objects the provision of means for operating reciprocating pumping units or the like in an entirely automatic manner.

One of the important objects of this invention is to provide a device of the class described which can be employed to great advantage in connection with pumps for oil, water or other sub-surface elements, wherein a hydraulic means is employed as the motivating element, said hydraulic means being activated by a pump and controlled by means of the valve of this invention and its connections.

Another important object of the invention is the provision of a pumping unit, having an automatic flow control valve which is practically noiseless in operation, thereby distinguishing to a great degree from present devices which are often quite objectionable on that account, particularly in residential districts.

A further important object of this invention is to provide in combination with a water, oil or other similar pump, an automatically acting control valve which can be readily and simply changed to adjust the length of strokes of the pump which it governs.

Still another and further important object of this invention is to provide a novel type of valve for use in connection with the system of this invention, which will be positive and efficient in operation, simple and rugged of construction and, therefore, not likely to get out of order.

Yet another object of the invention is the provision of a flow control valve which is substantially automatic in operation and which can be simply and efficiently employed in conjunction with all types of hydraulically operated pumps, regardless of size, so long as they are of the reciprocating type.

Other and further important objects of the invention will be apparent from the disclosures in the accompanying drawings and following specification.

The invention, in a preferred form, is illustrated in the drawings and hereinafter more fully described.

Figure 1:
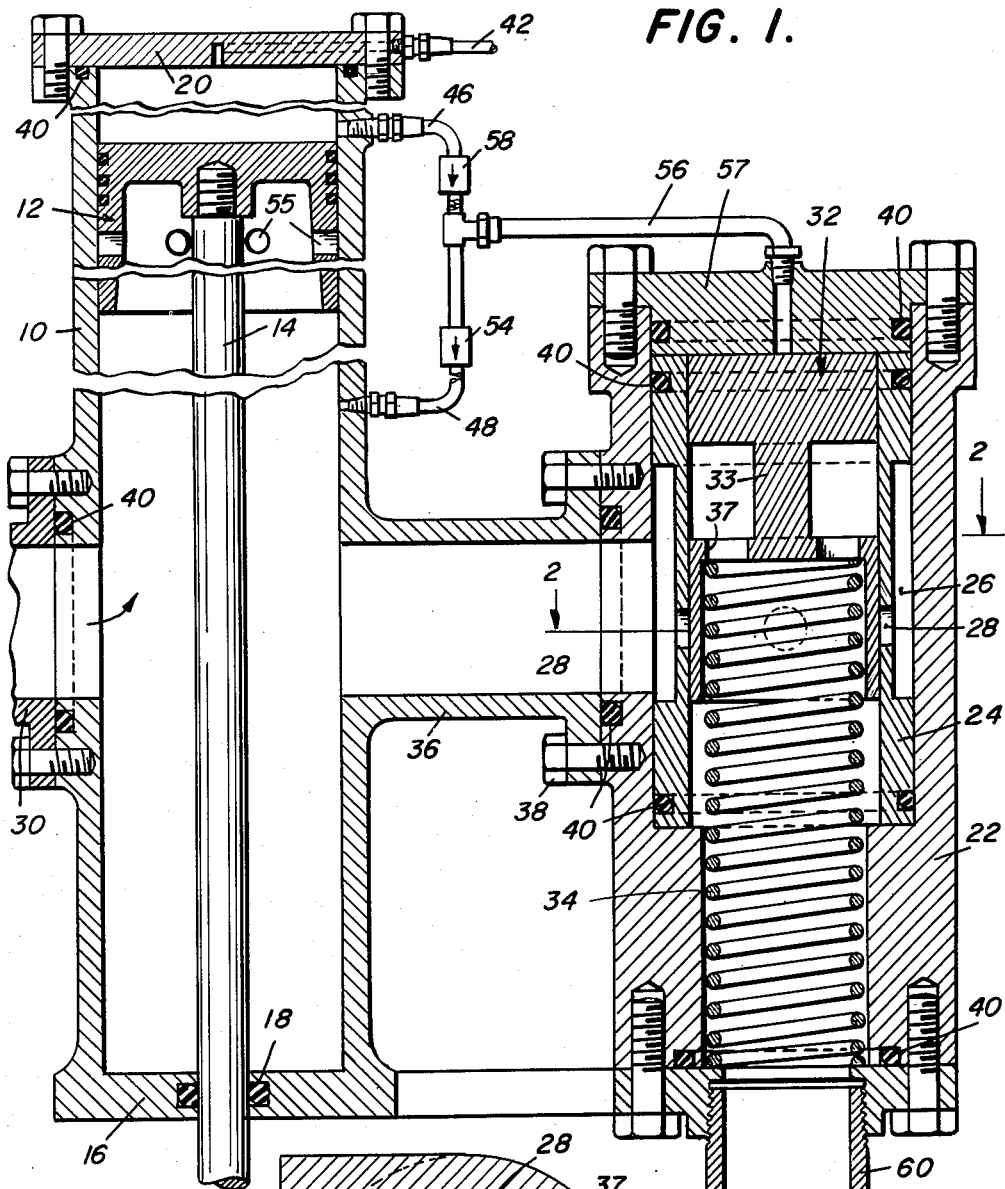
Figure 1 is an elevational view, almost entirely in section of the flow control valve of this invention and showing the same as associated with a representative pumping unit, such as one employed for oil wells.

The reference numeral 10 indicates generally the cylinder of a pump such as is ordinarily used in connection with oil wells, deep water wells and the like, but it will be evident that the flow control valve of this invention can be satisfactorily employed with practically any type of reciprocating piston pump with little or no change or adaptation.

Figure 3:
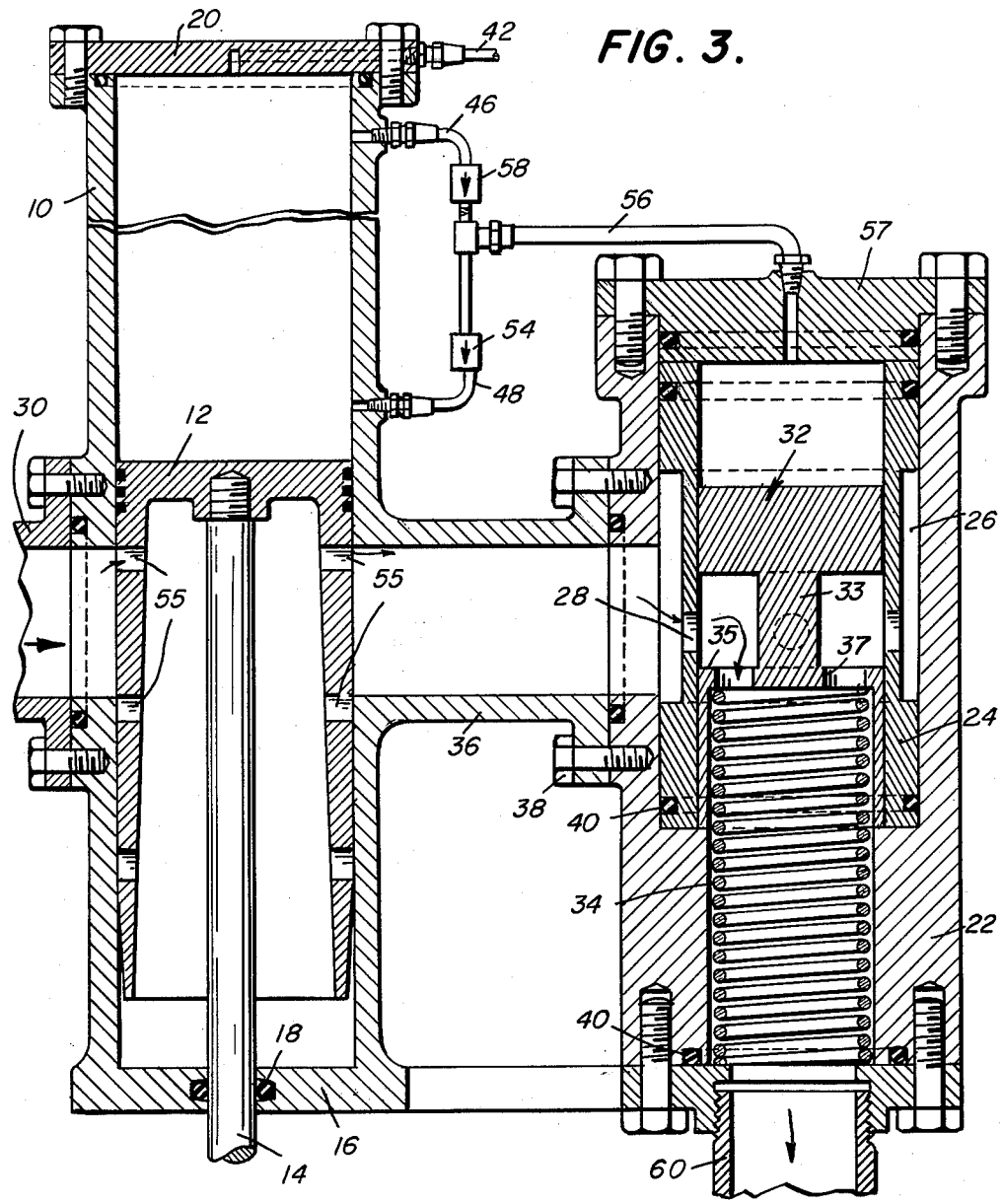
Figure 3 is a combined elevation and part sectional view, somewhat similar to the showing of Figure 1, but illustrating all the operating parts in different positions.

A piston 12 is in the cylinder 10 and is connected to a pump rod or the like 14 in the usual manner, and the rod reciprocates in a leak-proof opening in the bottom 16 of the cylinder 10, this being equipped with a gasket or the like 18. The cylinder 10 is broken away in places to foreshorten the showing of same, because in actual practice it is obviously much longer than as illustrated in Figures 1 and 3 (see Figure 4). The cylinder 10 is shown as equipped with a removable cover 20.

A pair of pipes of relatively large inside diameter 30 and 36 are either connected to or otherwise formed integral with the cylinder 10 at its lower end; and, as indicated by the arrow leading from the pipe 30 in Figure 1, this pipe is for the purpose of allowing fluid from a motivating pump 13 to pass into the cylinder 10 below the piston 12 and thereby force the same upwardly into the position shown in Figure 1. The pipe 36 allows liquid or fluid to pass out of the cylinder 10 when the piston 12 is moving downwardly and into the cycling valve 22 of this invention.

This flow of liquid is automatically governed and controlled by the valve of this invention, which comprises essentially a case or body 22. A sleeve 24 is mounted in the body 22, and this is shaped as shown in Figure 1 with an exterior annular recess 26 having ports 28 therein.

Figure 2:
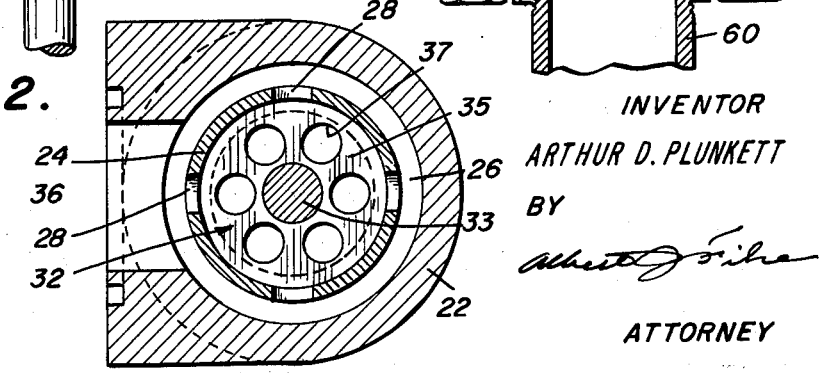
Figure 2 is a section on the broken line 2—2 of Figure 1, looking in the direction indicated by the arrows.

A piston 32 moves in the sleeve 24 and is normally impelled into its uppermost position by means of a helical spring 34, which is mounted in the lower portion of the control valve body or case 22. The body 22 can be directly connected to the lateral tubular extension 36 of the pump cylinder 10 by bolts or the like 38, but a more remote connection can be made if desired. The head of the piston 32 is provided with a downward extension 33, which includes an annular disc 35, having a series of openings 37 therein (Figure 2) and suitable fluid or liquid sealing elements are employed as desired or necessary in the form of O-rings or gaskets 40.

A return pipe 42 is in the top 20 of the cylinder 10, and this carries any excess leakage fluid back to a reservoir 44 through a check valve 45.

A pipe 46 leads from the top of the cylinder 10, being connected thereto at a point just below the uppermost limit of the travel of the piston 12 and has a check valve 58 therein just ahead of a lateral connection 56, which leads into the top 57 of the case of the control valve 22. An extension 48 of the pipe 46 is provided with a check valve 54 which is below the take-off line 56, and this pipe 48 is connected into the lower end of the cylinder 10, adjacent the outlet pipe 36 and at a point where it is closed when the piston 12 is in its lowermost position. In this lower position, the piston 12 substantially closes the inlet 30 and the outlet 36.

Downward movement of the piston 12 in the cylinder 10 will obviously create a vacuum in all the space above the piston as long as its downward movement continues, and this is sustained because the check valves 45 and 58 are automatically closed. However, when the piston reached the lower end of its stroke, it will pass the port leading to the pipe or line 48, whereupon the existing vacuum will create a drop in pressure in the top of the valve body 22 through the line 56, and the piston 32 in this valve body will accordingly move upwardly, this motion being assisted by the action of the spring 34. At this point the ports 28 are closed (Figure 1) and fluid from the prime mover 13 will enter the space below the piston 12 through the ports 55; and, having no exit through the ports 28, will immediately initiate an upward movement of the piston 12. It follows that the piston 12, while in operation, never actually reaches the extreme lower end of the cylinder 10, because its downward movement is cushioned by slow exit of the hydraulic fluid just before the upward motion begins. The only time when the piston 12 is actually at the bottom of the cylinder 10 is when the prime mover is shut down and all operations cease. At the same time, the piston 32 in the valve body 22 is automatically at the top of its stroke, as shown in Figure 1, whereupon starting of the prime mover 13 will immediately force the well piston 12 into upward movement and no preliminary adjustment of the valve piston 32 or any other parts of the control valve is necessary.

A return line 60 leads from the bottom of the control valve body 22 back to the reservoir 44, and a filter 62 is provided in the line 64 which leads from the reservoir to the pump 13. A constant pressure outlet valve 66 is provided in the line 30 leading from the pump to the cylinders 10 and 22, and a pressure relief valve 68 is provided, having a line 70 leading back to the reservoir 44. The reservoir has a fill-pipe 72 with a vented cover 74.

Figure 5:
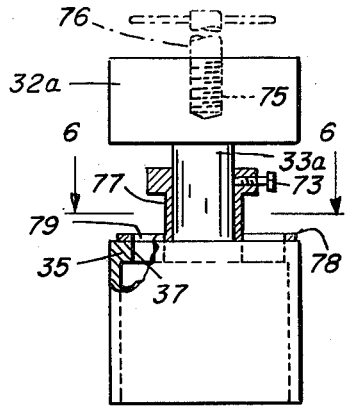
Figure 5 illustrates a modified form of piston or plunger, somewhat similar to that shown in Figure 1, which has a variable orifice for controlling the speed of operation of the main pump.
Figure 6:
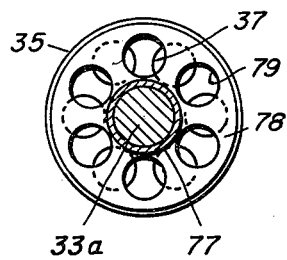
Figure 6 is a sectional view taken on the line 6—6 of Figure 5, looking downwardly.

As best shown in Figure 5, the head 32a of the piston in the body 22 can be equipped with a tapped recess 75 for insertion of a removing tool 76 and the stem 33a may have a sleeve 77 fitted therearound, the lower end of which is provided with a disc 78, having a series of openings 79 therein. The sleeve 77 can accordingly be rotated to either completely open or partially close the openings 37 in the head 35 of the piston, whereby the available orifice area can be varied and accordingly provide for changing the speed of the passage of fluid through the valve, and hence the number of strokes per unit of time of the main pump piston 12. A set-screw 73 can be employed to fix the sleeve 77 in desired adjusted position.

Figure 7:
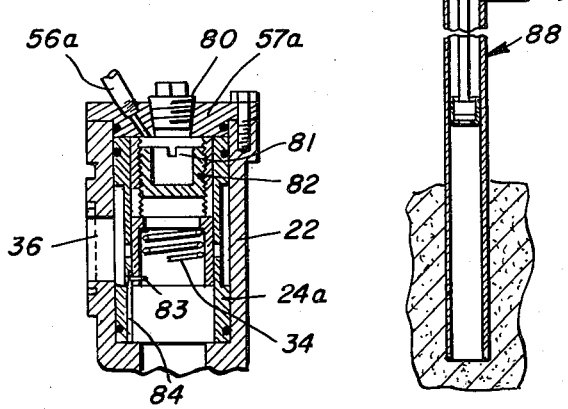
Figure 7 illustrates another form of the invention where-in certain interior parts are rendered more readily accessible.

In Figure 7 another form of construction of a portion of the control valve body 22 is illustrated, whereby the varying feature for controlling liquid flow can be made accessible by simply removing a screw-threaded plug 80 from the valve head 57a, whereupon the means of a suitable tool inserted in a slot 81 of a threaded plug 82. The same can be rotated to vary the net orifice area. A pin 83 is fitted in a groove 84 in the sleeve 24a in order to keep the plunger from turning when adjustments are made in the orifice area.

Figure 4:
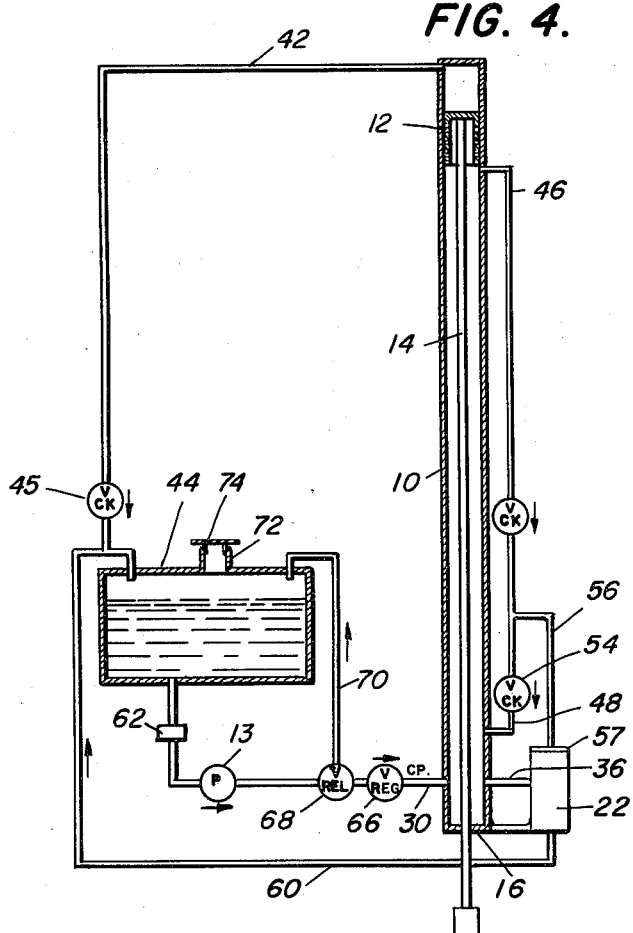
Figure 4 is an elevation, somewhat diagrammatic, showing any conventional lift pump or the like operating by the cycle valve of this invention and its appurtenances.

The pump 10—12 can be employed to operate any ordinary or special type of unit such as that comprising part of an oil well, as indicated at 88 in Figure 4; but other operations may be controlled similarly and in an obvious manner.

As illustrated in Figure 1, where the control valve is shown in a closed position, it is held in this uppermost position in its body 22 by pressure of the spring 34. Pressure is then built up or increased in the system to the required or predetermined workload, and fluid from the pump 13 flows into the cylinder 10 behind the piston 12, moving it upwardly; and any leakage liquid ahead of the piston 12 passes through the pipe 42 and back to the reservoir. At the same time the exit pipe 36 is closed because the skirt of the valve piston 32 covers the ports 28 in the sleeve 24. However, pressure of fluid in the pipe 56 overcomes the load of the spring 34, whereupon the piston 32 moves downwardly past the ports 28, allowing hydraulic fluid or the like to pass through the metering ports 37 or 79. This liquid then exits to the pipe 60 and returns to the reservoir, allowing a pressure drop in the system, whereupon the piston 12 moves downwardly, creating a vacuum in the space of the upper end of the cylinder 10. This vacuum, together with the existing pressure of the spring 34, again moves the piston 32 upwardly, closing the ports 28, reinstating the cycle of operation. The operation is properly cushioned because the fluid is alternatively slowly compressed and similarly released in the system by movement of the pistons, giving a smooth action, the speed of which is controlled by the size of the ports or orifices 37—79.

In operation, any fluid which might enter the space above the piston 12 in the cylinder 10 will be drained or forced out through the line or pipe 42. It will not exit through the pipe 46 because of the check valve 58 and also because there is never any very great quantity of such fluid and the movement of the piston 12 past the orifice leading to the pipe 46 is relatively fast. The hydraulic fluid will pass out through the pipe 42 only because it is small in quantity and will obviously be forced out through this pipe when the piston 12 reaches the top of its travel.

With regard to the action of the spring 34, it is explained that this is in practically all instances assisted in its movement by the fact of the existence of a low pressure area in the space above the piston 32. However, when the unit is first started with the piston 12 at the extreme bottom of the cylinder 10, the spring 34 must operate per se. The double acting force of both vacuum and spring pressure on the piston 32 when the device is in operation is one of the important features of this invention.

Leakage is held to a minimum by proper fittings and sealing elements, and any leakage that does occur will have no effect on the valve because such fluid simply returns to the reservoir, having only one moving part. The valve has a minimum of wear and a resultant long operating life. Adjustments can be made with little or no difficulty; and even after wear occurs, certain parts can be plated or otherwise built up for refitting.

It will be evident that herein is provided a complete system or hydraulic unit which achieves controlled reciprocating piston action with either fast or slow action as desired by the operator in order to provide efficient well operation. The unit is remarkably quiet, and being simple of construction and composed of a minimum number of parts, is more economical to construct and operate than other devices now in use for this purpose. The cycle is simple and long. Uninterrupted, continuous operation is assured with a minimum of attention to maintenance work.

This invention relates particularly to the control valve, and the pump unit 10—12 is illustrated simply to demonstrate the method of operation and control which the valve of this invention provides; and it will be obvious that this control unit is not necessarily limited to an oil well or similar pump, as illustrated, but may be employed for other automatic controls of various hydraulic systems, regardless of construction or method of operation.

I am aware that many changes may be made and numerous details of construction varied throughout a wide range without departing from the principles of this invention; and I, therefore, do not propose limiting the patent granted hereon otherwise than as necessitated by the prior art.

I claim as my invention:

In a pumping unit which comprises a reservoir for hydraulic fluid, a prime mover for the fluid, a cylinder forming part of the pump unit, said cylinder having a piston therein below which the liquid is forced by the prime mover and a conduit for the passage of fluid from the reservoir, a flow control valve comprising a main body portion to which the conduits are connected, a second piston in the body portion, a helical spring beneath the piston normally urging the same to an upper-most position in the body, an exit line leading from the body back to the fluid reservoir, a sleeve in the body portion, said second piston reciprocable in the sleeve, the sleeve having an exterior annular recess and ports from the recess to the interior thereof, the reciprocating movement of the piston in the sleeve alternately opening and closing the ports, the second piston including a central extension, an annulus below the extension, said annulus having openings therein for the passage of fluid therethrough, the movement of the second piston to its lower-most position against the tension of the spring allowing a flow of fluid through the ports and the openings in the annulus to the exit line of the unit and an adjustable fluid flow control element mounted on the second piston, said control valve being alternately subjected to pressure and vacuum conditions, a packing gland separating the space below the head of the first piston from the main fluid line connections and the valve operating space therein, the adjustable fluid flow control element comprising a pair of cooperating discs, each disc having a series of openings therein, one of the discs forming an integral portion of the second piston and the other disc being rotatable with respect thereto, the rotatable disc fixed upon a second sleeve, said sleeve being fitted about a cylindrical portion of the second piston and a set screw in the sleeve for fastening its perforated plate in desired adjusted position, the first piston closing certain of the conduits at one end of its stroke and opening and alternately closing other conduits at the other end of its stroke and wherein openings are provided in the sides of the first piston for passage of a predetermined lessened amount of fluid therethrough at one end of its stroke.

References Cited in the file of this patent

UNITED STATES PATENTS

| | | |
|---|---|---|
| 2,048,550 | Helenberg | July 21, 1936 |
| 2,202,216 | Madsen | May 28, 1940 |
| 2,583,285 | Zehnder | Jan. 22, 1952 |
| 2,645,900 | Hutchison | July 21, 1953 |
| 2,708,912 | Vanalstyne | May 24, 1955 |
| 2,726,642 | Zinty et al. | Dec. 13, 1955 |